(12) United States Patent
Hemmi et al.

(10) Patent No.: US 6,275,184 B1
(45) Date of Patent: Aug. 14, 2001

(54) MULTI-LEVEL SYSTEM AND METHOD FOR STEERING AN ANTENNA

(75) Inventors: Christian O. Hemmi, Plano; R. Thomas Dover, Prosper; John H. Harrison, Jr., Plano; James L. Haws, McKinney; David B. Webb, Plano, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/452,019

(22) Filed: Nov. 30, 1999

(51) Int. Cl.⁷ .......................... H04B 7/185; H01Q 21/00
(52) U.S. Cl. .......................................... 342/354; 343/853
(58) Field of Search ................... 342/354; 343/850–865

(56) References Cited

U.S. PATENT DOCUMENTS

| | | |
|---|---|---|
| 3,761,936 | 9/1973 | Archer et al. . |
| 3,993,999 | 11/1976 | Hemmi et al. . |
| 4,100,548 | 7/1978 | Hemmi et al. . |
| 4,381,509 | 4/1983 | Rotman et al. . |
| 4,769,646 | 9/1988 | Raber et al. . |
| 5,327,147 | 7/1994 | Caille et al. . |
| 5,548,294 | 8/1996 | Sturza . |
| 5,576,721 | 11/1996 | Hwang et al. . |
| 5,621,415 | 4/1997 | Tuck . |
| 5,642,122 | 6/1997 | Lockie et al. . |
| 5,650,788 | 7/1997 | Jha . |
| 5,677,796 | 10/1997 | Zimmerman et al. . |
| 5,736,959 | 4/1998 | Patterson et al. . |
| 5,936,588 | 8/1999 | Rao et al. . |
| 5,936,591 | * 8/1999 | Yamasa et al. ...................... 343/853 |

FOREIGN PATENT DOCUMENTS

| | | |
|---|---|---|
| 0 373 257 A1 | 6/1990 | (EP) . |
| 0 707 356 A1 | 4/1996 | (EP) . |
| 0 793 291 A2 | 9/1997 | (EP) . |
| 0 803 930 A2 | 10/1997 | (EP) . |
| 2045714 | 5/1971 | (FR) . |
| 2 205 996 | 12/1988 | (GB) . |
| 2 315 644 | 2/1998 | (GB) . |
| WO 98/10305 | 3/1998 | (WO) . |

OTHER PUBLICATIONS

J. Paul Shelton, "Focusing Characteristics of Symmetrically Configured Bootlace Lenses," IEEE Transactions on Antennas and Propagation, vol. AP–26, No. 4, pp. 513–518, Jul. 1978.

(List continued on next page.)

*Primary Examiner*—Thomas H. Tarcza
*Assistant Examiner*—Fred H. Mull
(74) *Attorney, Agent, or Firm*—Baker Botts L.L.P.

(57) ABSTRACT

A system for steering an antenna includes a first component that includes a first lens and is operable to perform a first focusing of a plurality of signals to form a plurality of focused signals. The system also includes a second component that includes a second lens and is operable to form a first focused beam by performing a second focusing of the plurality of focused signals. The second component further includes a first splitter and is further operable to split the first focused beam into a first set of intermediate beams. The system further includes a third component that includes a second splitter and is operable to split a particular one of the first set of intermediate beams into a second set of intermediate beams. The third component further includes a first combiner and is further operable to combine a particular one of the second set of intermediate beams with at least one other intermediate beam split from a second focused beam to generate a composite beam. The system includes an additional fourth component that includes a second combiner and is operable to combine the composite beam with at least one other composite beam to generate a steered final composite beam for a particular ground-based cell.

20 Claims, 7 Drawing Sheets

OTHER PUBLICATIONS

David T. Thomas, "Multiple Beam Synthesis of Low Sidelobe Patterns in Lens Fed Arrays," IEEE Transactions on Antennas and Propagation, vol. AP–26, No. 6, pp. 883–886, Nov. 1978.

R. Gupta, A. Zaghloul, T. Hampsch, and F. Assal, "Development of a Beam–Forming Matrix Using MMICIs for Multibeam Active Phased Arrays," IEEE 1994 APS International Symposium, vol. 2, pp. 844–847, 1994.

E.P. Ekelman, E.C. Kohls, A.I. Zaghloul, and F.T. Assal, "Measured Performance of a Ku–Band Multibeam High--Power Phased–Array," IEEE APS International Symposium, pp. 852–855, Jun. 1994.

A.G. Roederer, N.E. Jensen, and G.A.E. Crone, "Some European Satellite–Antenna Developments and Trends," IEEE Antennas and Propagation Magazine, vol. 38, No. 2, pp. 9–21, Apr. 1996.

Richard C. Johnson, "Antenna Engineering Handbook," Third Ed., title page and pp. 18–2 to 18–7.

* cited by examiner

MULTI-LEVEL SYSTEM AND METHOD FOR STEERING AN ANTENNA

RELATED APPLICATIONS

This application is related to copending U.S. patent application Ser. No. 09/138,821, entitled "IMPROVED LENS SYSTEM FOR ANTENNA SYSTEM" and U.S. patent application Ser. No. 09/138,238, entitled "IMPROVED TWO-DIMENSIONALLY STEERED ANTENNA SYSTEM".

TECHNICAL FIELD OF THE INVENTION

This invention relates generally to antenna systems and more particularly to an improved multi-level system and method for steering an antenna.

BACKGROUND OF THE INVENTION

Communications networks employ satellites operating in geosynchronous orbits in combination with terrestrial facilities such as land lines, microwave repeaters, and undersea cables to provide communications over vast areas of the earth. Geosynchronous satellites and terrestrial facilities are both expensive to install and to maintain and thus are not a cost effective means of increasing network capacity. In addition, geosynchronous satellites which operate at an altitude of 22,300 miles above the earth are unsuitable for supporting cellular service because of the extremely high power levels that would be required to communicate with satellites at that altitude.

More recently, constellations of low earth orbit (LEO) satellites have been proposed and are being developed as a cost effective means for providing increased capacity and supporting cellular and broadband data service for communications networks. In such a constellation, the satellites are divided into a number of orbital planes. Because low earth orbit satellites move rapidly with respect to the earth, each orbital plane includes a number of satellites that maintain continuous coverage for underlying cells defined on the surface of the earth. The cells represent coverage regions for the satellites.

Low earth orbit satellites utilize antennas which form a cluster of beams matching the ground-based cells. In each satellite, the beams must be steered to maintain alignment with the cells during the time the satellite moves one cell width along its orbit. After the satellite has moved one cell width, all the beams are ratcheted forward one cell width in the direction of flight and the beams are reassigned to the next set of cells in the flight direction.

Existing beam steering systems are inadequate due to their size, complexity, and cost. Mechanical steering apparatuses, for example, are too bulky, heavy and/or consume too much power for use in satellites. Electronic steering systems typically use multiple phase shifters per antenna array element or a hybrid divider network with distributed phase shifters as a variable power divider network. The use of phase shifters greatly increases complexity of the antenna system and thus cost.

SUMMARY OF THE INVENTION

In accordance with the present invention, an improved multi-level system and method for steering an antenna are provided that substantially reduced disadvantages and problems associated with previously developed systems and methods.

In one embodiment of the present invention, a system for steering an antenna is disclosed that includes a first component that includes a first lens and is operable to perform a first focusing of a plurality of signals to form a plurality of focused signals. The system also includes a second component that includes a second lens and is operable to form a first focused beam by performing a second focusing of the plurality of focused signals. The second component further includes a first splitter and is further operable to split the first focused beam into a first set of intermediate beams. The system further includes a third component that includes a second splitter and is operable to split a particular one of the first set of intermediate beams into a second set of intermediate beams. The third component further includes a first combiner and is further operable to combine a particular one of the second set of intermediate beams with at least one other intermediate beam split from a second focused beam to generate a composite beam. The system includes an additional fourth component that includes a second combiner and is operable to combine the composite beam with at least one other composite beam to generate a steered final composite beam for a particular ground-based cell.

In another embodiment of the present invention, a system for steering an antenna includes a first component that includes a first lens and is operable to perform a first focusing of a plurality of signals received from a ground-based cell. The system further includes a second component that includes a second lens, a splitter, and a first combiner and is operable to perform a second focusing of the plurality of signals to form a first focused beam. The second component is further operable to split the first focused beam into a plurality of intermediate beams and combine at least one of the plurality of intermediate beams with at least one other intermediate beam split from a second focused beam to generate a composite beam. The system also includes a third component that includes a second combiner and is operable to combine the composite beam with at least one other composite beam thereby generating a steered final composite beam for the ground-based cell.

In yet another embodiment of the present invention, a method of steering an antenna includes focusing a plurality of signals into a focused beam, splitting the focused beam into a plurality of intermediate beams, combining at least one of the intermediate beams with at least one other intermediate beam split from another focused beam to generate a composite beam, and combining the composite beam with at least one other composite beam.

Technical advantages of the present invention include providing an improved system and method for steering an antenna. In particular, various embodiments of the antenna system use a planar lens array to focus signals. The planar lenses allow lensing and amplitude modulation functions to be combined into planar slats. As a result, the beam forming and steering network can be located internally to a satellite or other platform without only radiating elements protruding from the base. The planar slats can be manufactured in such a manner so as to be ideal for satellite or other applications where size or weight considerations are significant. Additionally, various embodiments of the present invention allow many different circuit elements to be fabricated within a common slat, such as a microwave circuit board, such that efficient steering of signals from distant cells may be accomplished using a compact structure composed of levels of slats. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
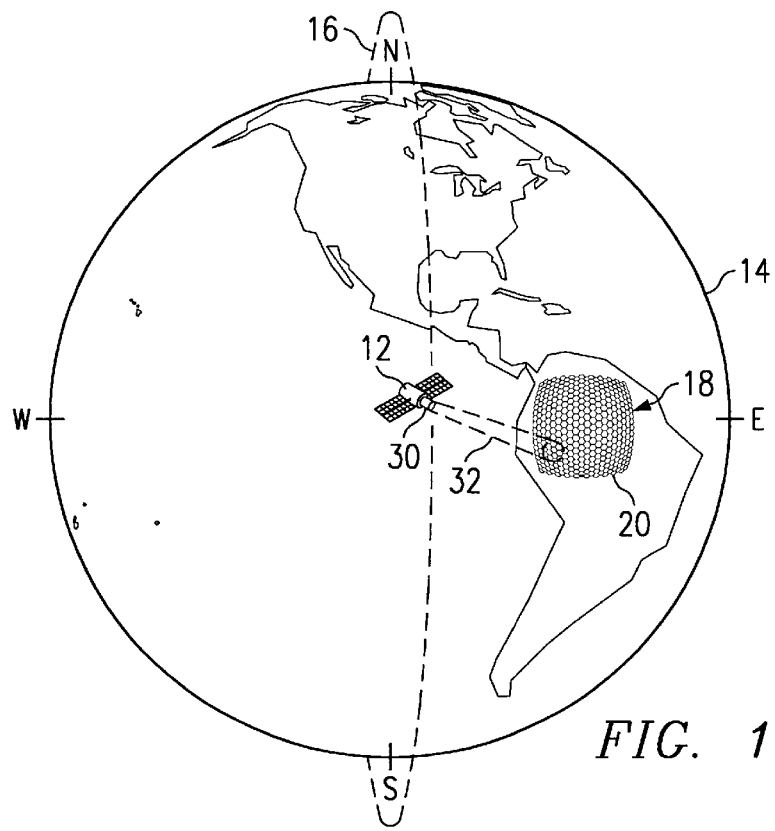
FIG. 1 is a schematic diagram illustrating a satellite in low earth orbit (LEO) in accordance with one embodiment of the present invention.

FIG. 1 illustrates a satellite 12 orbiting the earth 14 in a low earth orbit 16 and projecting a satellite footprint 18 onto a fixed grid of ground-based cells 20. The low earth orbit (LEO) satellite 12 forms part of a constellation of similar satellites that provide continuous coverage for the ground-based cells 20. In the constellation, the satellites are spaced apart in a plurality of orbital planes, with each orbital plane having a necessary number of satellites to provide continual coverage for the cells underlying that orbital plane. Thus, each satellite 12 immediately follows another satellite in its orbital plane and is itself immediately followed by still another satellite in that orbital plane. In one embodiment, for example, the constellation includes twenty-four (24) orbital planes with twelve (12) satellites in each orbital plane. In this exemplary embodiment, each satellite has an altitude of 1,350 kilometers, a footprint, or coverage area, 18, that is 1,660 kilometers by 1,660 kilometers, and an orbital period of about 112 minutes. It will be understood that the type, number, and orbital planes for the satellites 12 may be suitably varied.

Figure 2:
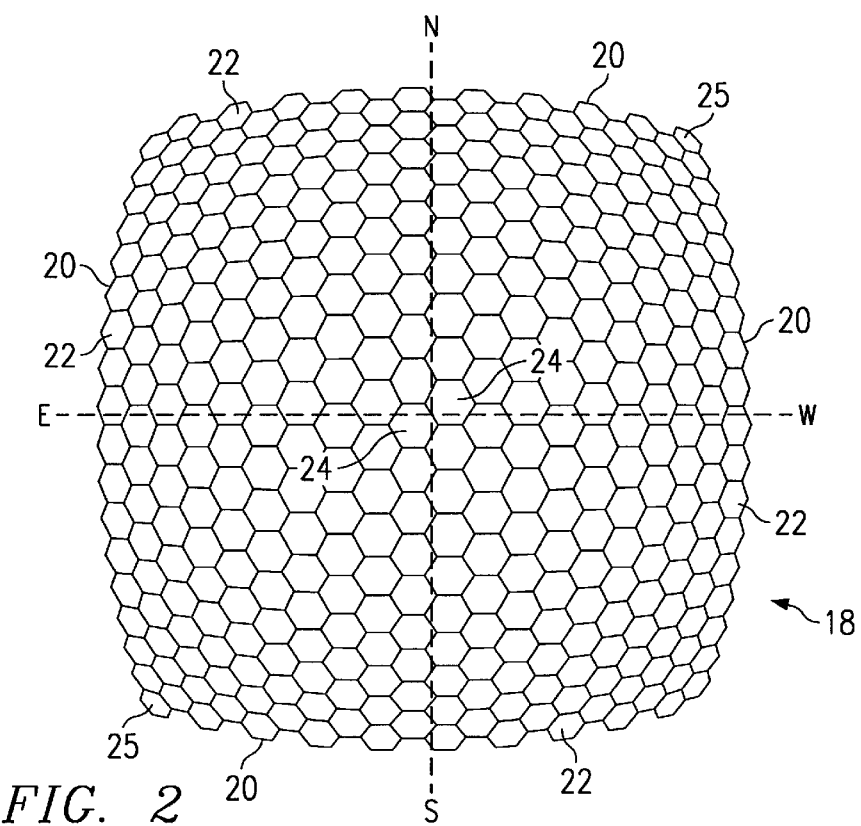
FIG. 2 is a schematic diagram illustrating ground-based cells within the coverage area for the satellite of FIG. 1.

FIG. 2 illustrates details of the ground-based cells 20 within the footprint 18. For the exemplary embodiment in which the footprint 18 is 1,660 kilometers by 1,660 kilometers in size, the footprint 18 includes 725 hexagonal-shaped cells 20. Each hexagonal cell is 78.7 kilometers across. The size and shape of the ground-based cells 20 may be suitably varied so long as the cells 20 fully cover the footprint 18. For example, the footprint 18 may be tiled with square or radial cells 20.

Due to the geometry of low earth satellites 12 above the spherical surface of the earth 14, cells 22 near the edges of the footprint 18 have a much smaller angular size and closer angular spacing than cells 24 near the center of the footprint 18. In the exemplary embodiment, for example, the cells 24 at the center of the footprint 18 have an angular size of 3.5 degrees while the cells 22 near the edges of the footprint 18 have an angular size of 2.4 degrees and the cells 25 at the corner of the footprint 18 have an angular size of 1.8 degrees.

Returning to FIG. 1, the satellite 12 includes a multi-beam antenna system 30 for communicating directly with a plurality of portable, mobile, and fixed terminals in the ground-based cells 20. Each beam 32 is assigned to a ground-based cell 20. As described in more detail below, the multi-beam antenna system 30 shapes and steers each beam 32 so that the assigned ground-based cell 20 is illuminated by that beam 32 until the next beam 32 moves into position on that cell 20 or the next satellite 12 moves into position to illuminate the cell 20. Thus, the beams 32 are shaped to match the ground-based cells 20 and are steered to maintain alignment with the ground-based cells 20 during the time the satellite 12 moves one cell width along its orbit. After the satellite 12 has moved one cell width, the beams 32 are each ratcheted forward one cell width in the direction of flight and beams 32 are reassigned to the next set of cells in the flight direction. The set of cells 20 dropped by the satellite 12 are picked up by a following satellite 12. In this way, continuous coverage for the ground-based cells 12 is maintained. For the exemplary embodiment, the beams 32 are circular to match cells 24 near the center of the footprint 18 and elliptical to match cells 22 near the edge of the footprint 18.

FIGS. 3–6 illustrate details of an antenna system 40 for the low earth orbit satellite 12 in accordance with one embodiment of the present invention. In this embodiment, the antenna system 40 uses a planar lens system to focus signals received from the ground-based cells 20. As used herein, signal means signal received from ground-based cells 20 and any signal generated or formed based on such signals. A planar lens system is a lens system that uses one or more planar lenses.

Figure 3:
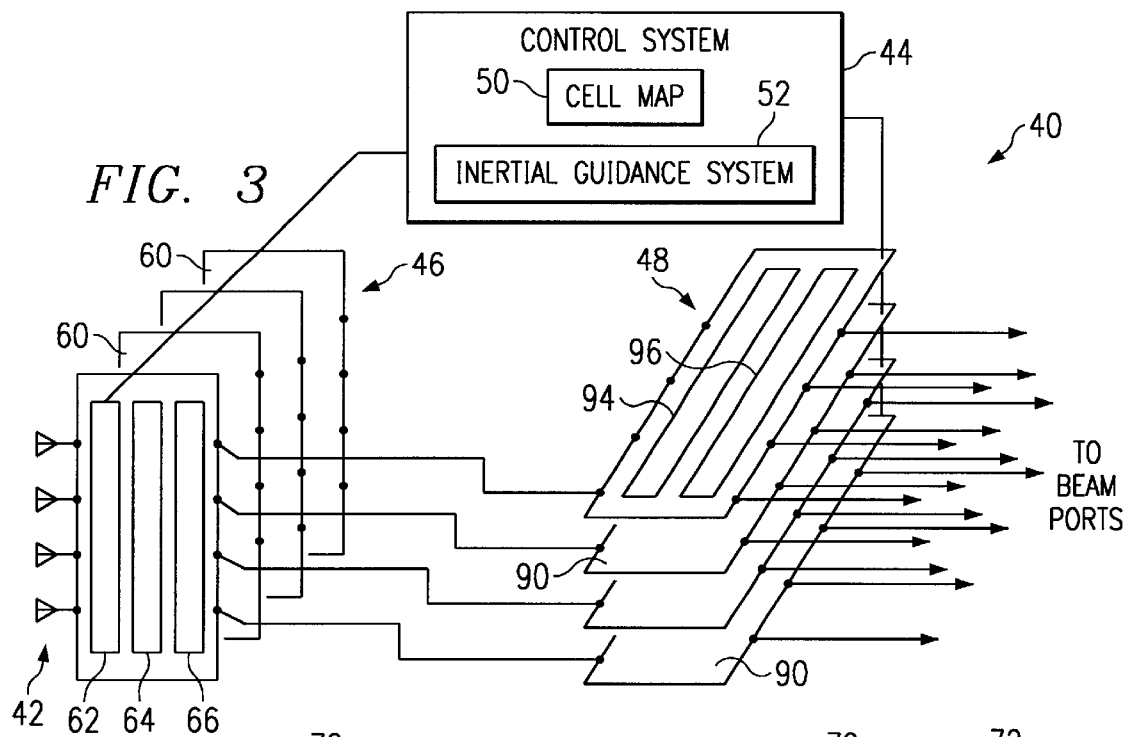
FIG. 3 is a schematic diagram illustrating a two-dimensionally steered antenna system for the satellite of FIG. 1 in accordance with one embodiment of the present invention.

Referring to FIG. 3, the antenna system 40 includes a plurality of radiating elements 42, a control system 44, a first set of array elements 46, and a second set of array elements 48. The radiating elements 42 receive component beam signals for the ground-based cells 20. As described in more detail below, the control system 44 controls steering of the component beams, which is performed by the first and second set of array elements 46 and 48.

The control system 44 includes a cell map 50 and an inertial guidance system 52. The cell map 50 stores information for each ground-based cell 20 within the orbital path of the satellite 12. The cell information includes the identification, location, and center of each cell 20. The inertial guidance system 52 tracks the position of the satellite 12 including its altitude, latitude, and longitude. The control system 44 uses the satellite positioning information along with the cell map information to calculate an angle for each beam 32 to its assigned cell 20. Based on this angle, the control system 44 determines the weight that should be given to each component beam to steer the beams 32. This information is communicated to the first and second set of array elements 46 and 48 which weigh and combine the component beams accordingly.

For the embodiment of FIGS. 3–6, the first set of array elements 46 steer the beams 32 in a first vertical direction and the second set of array elements 48 steer the beams 32 in a second horizontal direction. In this embodiment, the control system 44 provides information to the first set of array elements 46 for steering in the first direction and information to the second set of array elements 48 for steering the beams 32 in the second direction. It will be understood that the first and second directions may be otherwise oriented with respect to each other and that the control system 44 may provide other or different information to the array elements 46 and 48 to control beam 32 steering.

The first set of array elements 46 includes a plurality of discrete elements 60. Each element 60 includes an array of low noise amplifiers (LNA) 62, a first planar lens 64, and a first steering system 66. The low noise amplifiers 62 amplify the component beam signals received by the radiating elements 42.

The first planar lens 64 is a parallel plate or other suitable lens having two-dimensional characteristics. The first planar lens 64 is a Stripline Rotman lens, bi-focal pillbox lens, or other suitable two-dimensional lens. A Rotman lens is preferred because it has three focal points and thus better performance. For frequencies in the upper microwave region, the Rotman lens is constructed using microwave circuit board materials such as Duroid made by Rogers Corp. or similar materials.

Figure 4:
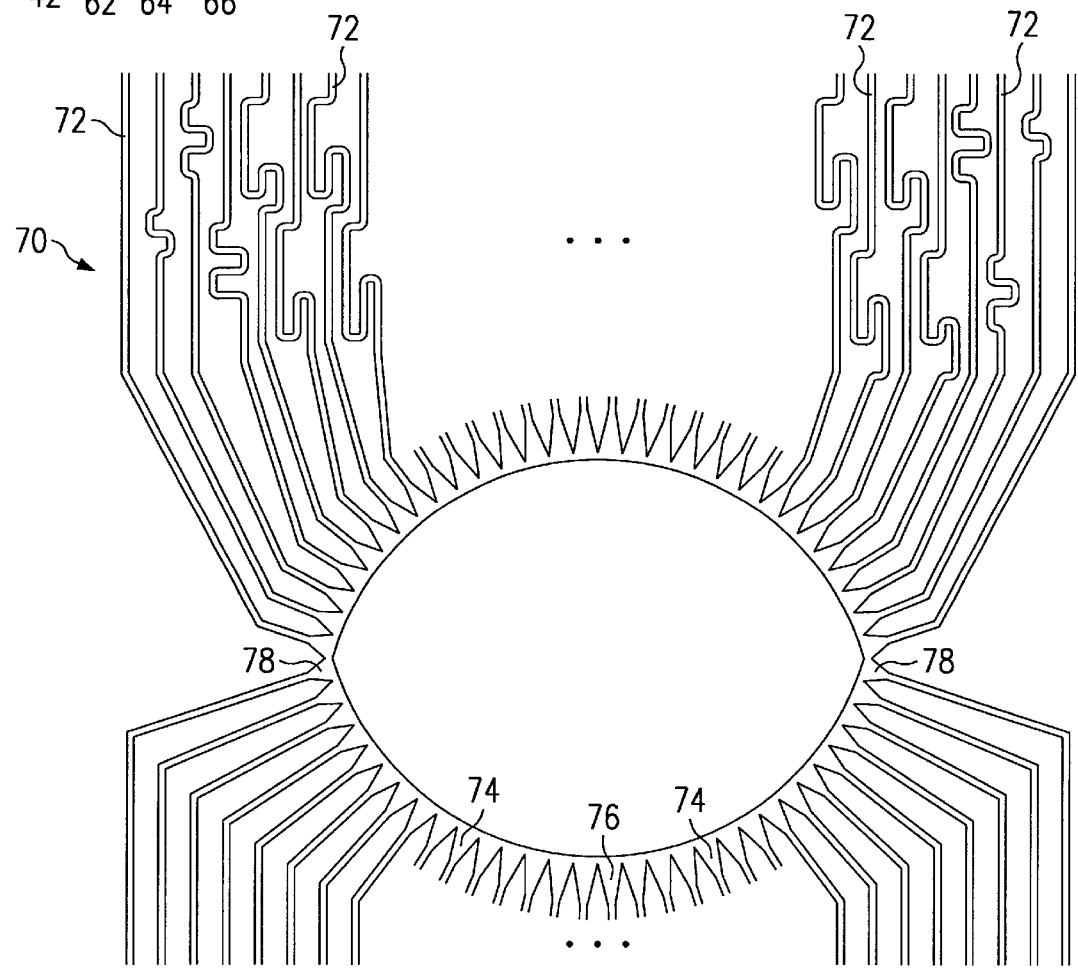
FIG. 4 is a schematic diagram illustrating a Stripline Rotman lens with non-uniform feed elements for the antenna system of FIG. 3.

FIG. 4 illustrates a Stripline Rotman lens 70 for use as the first planar lens 64 in accordance with one embodiment of the present invention. Referring to FIG. 4, the Stripline Rotman lens 70 includes a plurality of striplines 72 of varying lengths that focus the component beams in the first direction. Feed elements 74 at the bottom of the Rotman lens 70 collect the component beams that have been focused in the first direction.

In accordance with one aspect of the present invention, the feed elements 74 are non-uniform in size and spacing in order to shape the beams 32 in the first direction to match the angular size and the angular spacing of the ground-based cells 20 in the first direction. The beams 32 match the angular size of the ground-based cells 20 when they closely approximate the size of the cell as seen by the antenna system 40. In particular, feed elements 76 near the center of the Rotman lens 70 that correspond to cells 24 near the center of the footprint 18 are larger and spaced further apart than feed elements 78 at the edges of the Rotman lens 70 that correspond to cells 22 near the edge of the footprint 18 in accordance with the angular size of the cells 20. In one embodiment, the feed elements 74 are sized and spaced such that a substantially equal number of component beams are maintained for each ground-based cell 20. The particular size and spacing of the feed elements 74 may vary depending on the lens type, footprint size, cell size and shape, and other suitable criteria. By varying the size and spacing of feed elements 74, the component beams may be shaped without phase shifting. Accordingly, the complexity and cost of the antenna system 40 is reduced. In addition, the total number of component beams needed to cover the footprint 18 is reduced, which correspondingly reduces the number of feed elements 74 and other components in the beam-forming network.

Returning to FIG. 3, the first steering system 66 is operable to steer a beam 32 for a ground-based cell 20 in the first direction by weighing component beams associated with the ground-based cell 20 based on a position of the antenna system 40 relative to the ground-based cell 20 in the first direction. As previously described, this information is provided by the control system 44. The term based on the position of the antenna system 40 includes positions based on the position of any suitable element of the antenna system 40 as well as other elements of the satellite 12 or other platform offset from the antenna system 40 such that the beam steering information can be derived. Beams and other signals are associated with a ground-based cell 20 when that beam or signal is weighed, formed from, or otherwise used in forming, shaping, or steering the beam 32 for the cell 20.

Figure 5:
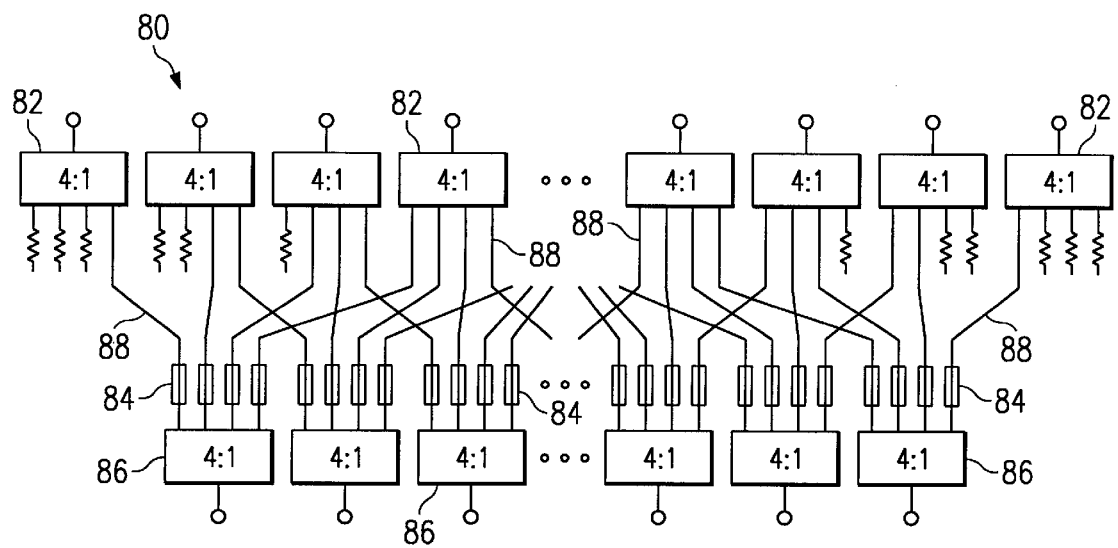
FIG. 5 is a schematic diagram illustrating details of an amplitude modulator for the antenna system of FIG. 3.

FIG. 5 illustrates details of the first steering system 66 in accordance with one embodiment of the present invention. In this embodiment, the first steering system 66 is an amplitude modulator 80. The amplitude modulator 80 modulates the amplitude and combines the component beams to steer the beams 32 in the first direction.

Referring to FIG. 5, the amplitude modulator 80 includes a plurality of splitters 82, attenuators 84, and combiners 86. The splitters 82 split the component beams onto four (4) intermediate paths 88 that are each cross-connected to different combiners 86 via the attenuators 84. As used herein, the term each means each of at least a subset of the specified elements. At the edge of the amplitude modulator 80, some of the intermediate paths 88 are grounded and thus not used in accordance with the component beam combination scheme of the amplitude modulator 80. For example, in the illustrated embodiment, splitters 82 at the edge of the amplitude modulator 80 have three (3) of their intermediate paths 88 grounded, the next set of splitters 82 in from the edge have two (2) of their intermediate paths 88 grounded, the next set of splitters 82 in from the edge have one (1) intermediate path 88 grounded. The remaining splitters 82 have all of their intermediate paths 88 cross-connected with combiners 86. It will be understood that other or different suitable combination schemes may be used. For example, combination schemes of 3:1 and 5:1 may be used. In addition, variable combination schemes may be used.

The attenuators 84 modulate the amplitude of signals on the intermediate paths 88 in accordance with control information provided by the control system 44. The term attenuators includes variable gain amplifiers and other suitable devices operable to adjust the amplitude of a signal. The attenuators 84 may be implemented as digital or analog circuits. The attenuator range should match the sidelobe levels for the beams 32. Resolution and accuracy of the amplitude controls may be varied as a function of the sidelobe and beam steering accuracy requirements.

For amplitude modulation in the exemplary embodiment, component beams are indexed with $(p,q)$ peaks located at $U_p$, $V_p$. Beam spacing are $\Delta U_p$ and $\Delta V_q$ in the N-S (first direction) and E-W (second direction) direction respectively. For a blend of at least three (3) beams in each of the first and the second directions, the control system 44 determines amplitude weighing based on the following equations:

If $|u-U_p| \leq 2\Delta u_p$ and $|v-V_q| \leq 2\Delta v_q$

Then $A_{pq} = \cos^2\left\{\frac{\pi}{4}\left(\frac{u_p - U_p}{\Delta u_p}\right)\right\}\cos^2\left\{\frac{\pi}{4}\left(\frac{v_q - V_q}{\Delta v_q}\right)\right\}$ Else $A_{p,q}=0$ where: $A_{p,q}$ is the amplitude of the $(p,q)$ beam; and $u_p$ and $v_q$ are coordinates of the center of the cell.

If the shaping function is constrained to be separable then for beams within p∈ [m, m+1, . . . m+M−1] and q∈ [n, n+1, . . . n+N−1]:

$$B_{p,q} = B_p' B_q''$$

Else $B_{p,q} = 0$.
The combined steering and shaping function will then be:

$$C_{p,q} = B_q' \frac{A_q'(u)}{A'(u)} B_q'' \frac{A_q''(v)}{A''(v)}$$

where: $(u_0, v_0)$ is the vector to the center of a cell.

The amplitude modulated and combined component beams form intermediate beams that are focused and steered in the first direction. The intermediate beams from each element 60 of the first array of elements 46 are fed into separate elements 90 of the second set of array elements 48. Each element 90 of the second array includes a second planar lens 94 and a second steering system 96. The second planar lens 94 is a Rotman lens 70 as previously described in connection with the first planar lens 64. In this case, the Rotman lens 70 focuses and shapes the intermediate beams in the second direction.

The second steering system 96 is operable to steer the beams 32 for a ground-based cell 20 in the second direction by weighing intermediate beams associated with the ground-based cell 20 based on a position of the antenna system 40 relative to the ground-based cell 20 in the second direction. The first steering system 96 is an amplitude modulator 80 as previously described in connection with the first steering system 66. The amplitude modulator 80 modulates and combines the intermediate beams in accordance with control information provided by the control system 44. In this case, the amplitude modulator 80 steers beams 32 in the second direction. Thus, the resulting beams 32 are fully steered and shaped for each ground-based cell 20.

The amplitude modulator 80 provides smooth continuous steering for the beams 32 in both the first and second directions. The amplitude modulator 80 is operable to scan each beam 32 a full ± one (1) beam width, or cell width, to take into account wobble of the satellite 12 and other factors and ensure that the beams 32 can maintain alignment with the ground-based cells 20 during the time the beam 32 is assigned to the cell 20. As previously described, after the satellite 12 moves one cell width, the beams 32 are each ratcheted forward one cell width in the direction of flight and the beams 32 are reassigned to the next set of cells in the flight direction. The set of cells 20 dropped by the satellite 12 are picked up by a trailing satellite 12 in the orbital plane. In this way, continuous coverage is maintained for the ground-based cells 20.

Figure 6:
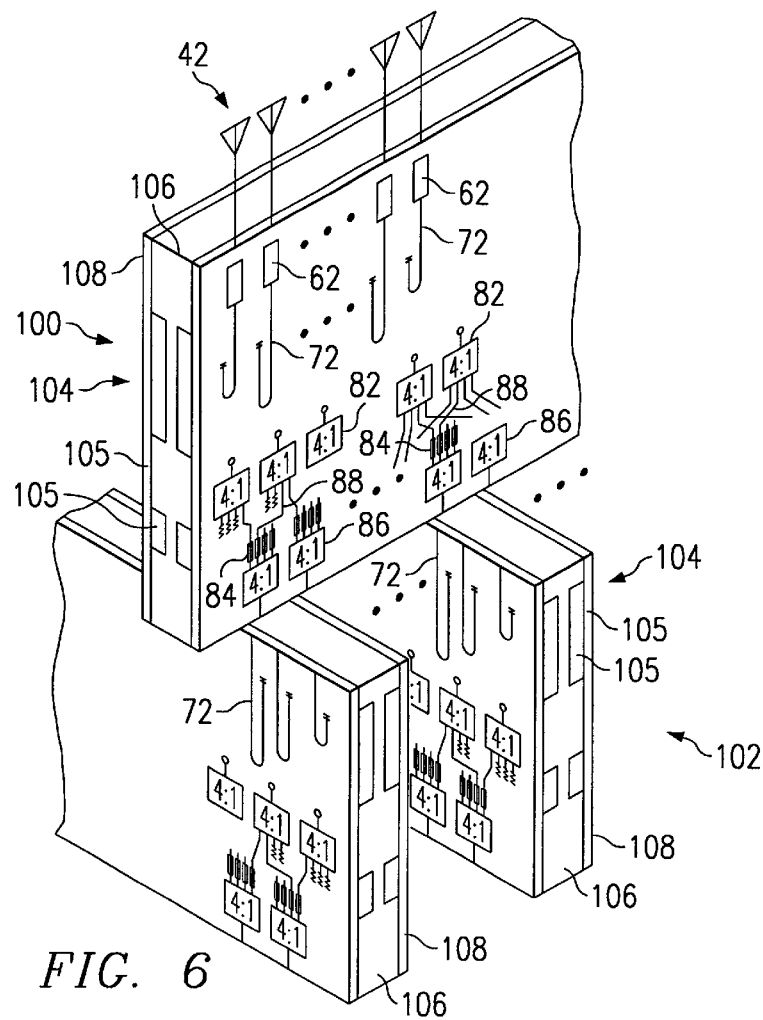
FIG. 6 is a schematic diagram illustrating packaging of the antenna system of FIG. 3.

FIG. 6 is a schematic diagram illustrating packaging of the antenna system 40 in accordance with one embodiment of the present invention. In this embodiment, the first set of array elements 46 are packaged in a first set of slats 100 and the second set of array elements 48 are packaged in a second perpendicular set of slats 102. The slats 100 and 102 each include a stripline circuit 104 formed from two circuit layers. Components of the array elements 46 and 48 are entirely fabricated within the two circuit layers 105. Preferably, the circuit layers each include a patterned conductor generally isolated between dielectric layers and shielded to minimize interference with the beam-forming network.

Referring to FIG. 6, in the stripline circuits 104, the striplines 72 for the Rotman lens 70 and the splitters 82 and combiners 86 for the amplitude modulator 80 are formed in the first circuit layer. The remainder of the Rotman lens 70 including the feed elements 74 are formed in the second circuit layer. The intermediate paths 88 are formed in both circuit layers and are cross-connected by interconnects extending between the circuit layers. The low noise amplifiers 62 are fabricated on the first circuit layer for the first set of slats 100.

The stripline circuits 104 are mounted to a cold board 106 which provides support and heat transfer for the stripline circuit 104. If the antenna system 40 is polarized to increase capacity, a corresponding set of stripline circuits 108 may be mounted to an opposite side of a cold board 106. Accordingly, the beam-forming and steering network can be located internally to a satellite or other platform with only radiating elements 42 protruding from the base. The planar slats are compact, light weight, and can be efficiently packed together. Accordingly, they are ideal for satellite and other applications that are size and weight sensitive. In addition, because the elements 60 and 90 are each fabricated entirely on only two circuit layers, the beam-forming and steering network is relatively inexpensive to fabricate.

For the exemplary embodiment, the satellite 12 includes sixty-two (62) slats 100 for the first set of array elements 46 and twenty-five (25) slats 104 for the second set of array elements 148. Slats 100 each include sixty-two (62) striplines 72 input to the Rotman lens 70 and twenty-eight (28) feed elements 74 output from the Rotman lens 70. The amplitude modulators 80 include twenty-eight (28) inputs and twenty-five (25) outputs. The slats 102 each include the Rotman lens 70 with sixty-two (62) stripline 72 inputs and thirty-two (32) feed elements 74 outputs. The amplitude modulator 80 includes thirty-two (32) inputs and twenty-nine (29) outputs for a total of seven hundred twenty-five (725) beams 32. The beams 32 are passed onto beam ports in the satellite 12 for processing.

Figure 7:
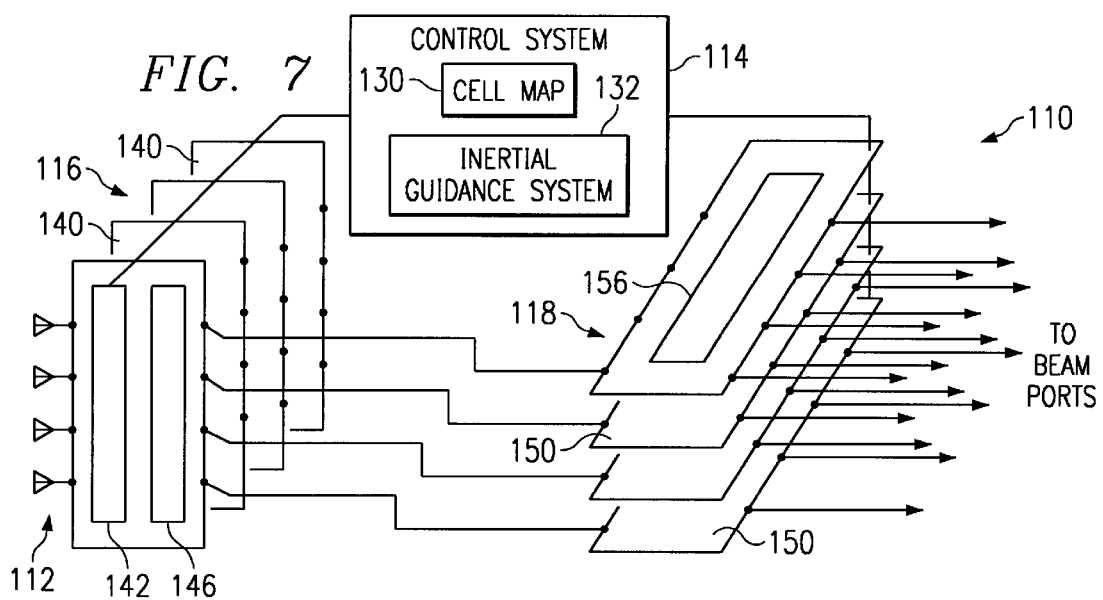
FIG. 7 is a schematic diagram illustrating a two-dimensionally steered antenna system for the satellite of FIG. 1 in accordance with another embodiment of the present invention.
Figure 8:
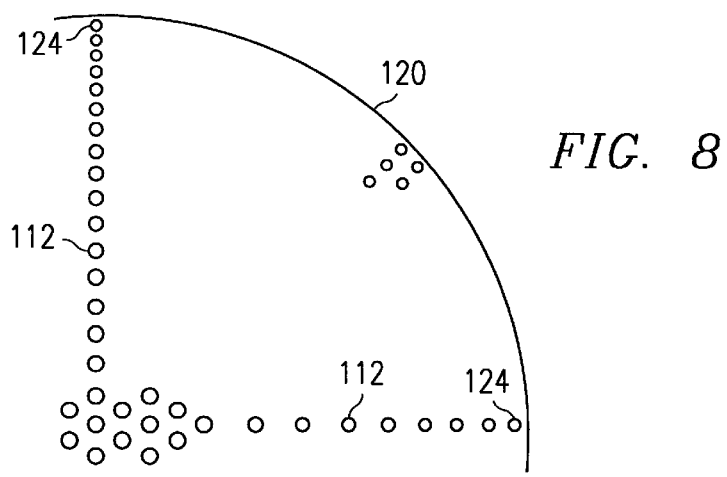
FIG. 8 is a schematic diagram illustrating a Luneberg lens with non-uniform feed elements for the antenna system of FIG. 7.
Figure 9:
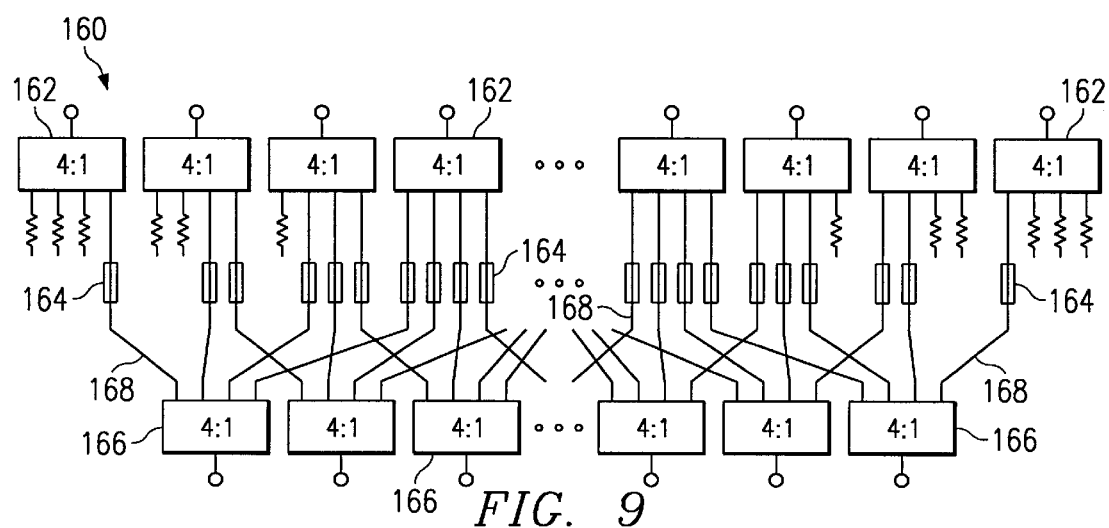
FIG. 9 is a schematic diagram illustrating details of an amplitude modulator for the antenna system of FIG. 7.

FIGS. 7–9 illustrate details of an antenna system 110 for the low earth orbit satellite 12 in accordance with another embodiment of the present invention. In this embodiment, the antenna system 110 uses a spherical dielectric lens to focus signals received from the ground-based cells 20. The spherical dielectric lens is a Luneberg or other suitable symmetrical lens. The Luneberg lens is made from concentric shells of dielectric material. The first shell has a nominal dielectric constant of 1.0, the center core has a dielectric constant of 2.0, and the intermediate shells vary uniformly between 1.0 and 2.0.

Referring to FIG. 7, the antenna system 110 includes a plurality of feed elements 112, a control system 114, a first set of array elements 116 and a second set of array elements 118. As described in more detail below, the feed elements 112 receive component beam signals for the ground-based cells 20. The control system 114 controls steering of the component beams, which is performed by the first and second array of elements 116 and 118.

Referring to FIG. 8, the feed elements 112 are mounted to a surface of a Luneberg lens 120 opposite the field of view of the lens 120 to receive component beams focused by the lens 120. In accordance with one aspect of the present invention, the feed elements 112 are non-uniform in size and spacing in order to shape the beams 32 to match the angular size of the ground-based cells. In particular, feed elements corresponding to cells 22 at the edge of the footprint 18 are smaller and spaced more closely together than feed elements 112 corresponding to cells 24 at the center of the footprint 18. In one embodiment, the feed elements 112 are sized and spaced such that a substantially equal number of component beams are maintained for each ground-based cell 20. The particular size and spacing of the feed elements 112 may vary depending on the lens type, footprint size, cell size and shape, and other suitable criteria. By varying the size and spacing of the feed elements 112, the components beams may be shaped without phase shifting. In addition, the total number of component beams needed to cover the footprint 18 is reduced by about one-half, which correspondingly reduces the number of feed elements 112 and other components in the beam-forming network.

Returning to FIG. 7, the control system 114 includes a cell map 130 and an inertial guidance system 132 as previously described in connection with the control system 44. The control system 114 uses the satellite positioning information of the interial guidance system 132 along with the cell map 130 information to calculate an angle for each beam 32 to its assigned cell 20. Based on this angle, the control system 114 determines the weight that should be given to each component beam to steer the beams 32. This information is communicated to the first and second set of array elements 116 and 118 which weigh and combine the component beams accordingly.

For the embodiment of FIGS. 7–9, the first set of array elements 116 steer the beams 32 in a first vertical direction and the second set of array elements 118 steer the beams 32 in a second horizontal direction. In this embodiment, the control system 114 provides information to the first set of array elements 116 for steering the beams 32 in the first direction and information to the second set of array elements 118 for steering the beams 32 in the second direction.

The first set of array elements 116 include a plurality of discrete elements 140. Each element 140 includes an array of low noise amplifiers (LNA) 142 and a first steering system 146. The low noise amplifiers 142 amplify the component beams as previously described in connection with the low noise amplifiers 62. The second set of array elements 118 includes a plurality of discrete elements 150 each having a second steering system 156. The components of the first and second set of array elements may be packaged into stacked slats as previously described in connection with first and second array elements 46 and 48. In this embodiment, however, the spherical lens is separate.

The first steering system 146 is operable to steer the beam 32 for a ground-based cell 20 in the first direction by weighing component beams associated with the ground-based cell 20 based on a position of the antenna system 110 relative to the ground-based cell 20 in the first direction. The second steering system 156 is operable to steer the beam 32 for a ground-based cell 20 in the second direction by weighing component beams associated with the ground-based cell 20 based on a position of the antenna system 110 relative to the ground-based cell 20 in the second direction. As previously described, control information for the steering systems 146 and 156 is provided by the control system 114.

FIG. 9 illustrates details of the first and second steering systems 146 and 156 in accordance with one embodiment of the present invention. In this embodiment, the first and second steering systems 146 and 156 are each an amplitude modulator 160. The amplitude modulator 160 modulates the amplitude of the intermediate beams and combines the modulated beams to steer the beams 32 in the first and second directions as previously described in connection with the amplitude modulator 80.

Referring to FIG. 9, the amplitude modulator 160 includes a plurality of splitters 162, attenuators 164, and combiners 166. The splitters 162 split the component beams into four (4) intermediate paths 168 that are each cross-connected to different combiners 166 via the attenuators 164. Intermediate paths 168 may be grounded for splitters 162 near the edge of the amplitude modulator 160 as previously described in connection with the amplitude modulator 80.

The attenuators 164 modulate the amplitude of the signals on the intermediate paths 168 in accordance with control information provided by the control system 114. Accordingly, as previously described in connection with the amplitude modulator 80, the amplitude modulator 160 provides smooth continuous steering for beams 32 in both the first and second directions. The amplitude modulator 160 is operable to scan each beam 32 a full ± one (1) beam width, or cell width, to ensure that the beams 32 can maintain alignment with the ground-based cells 20 during the time the beam 32 is assigned to the cell 20.

Figure 10:
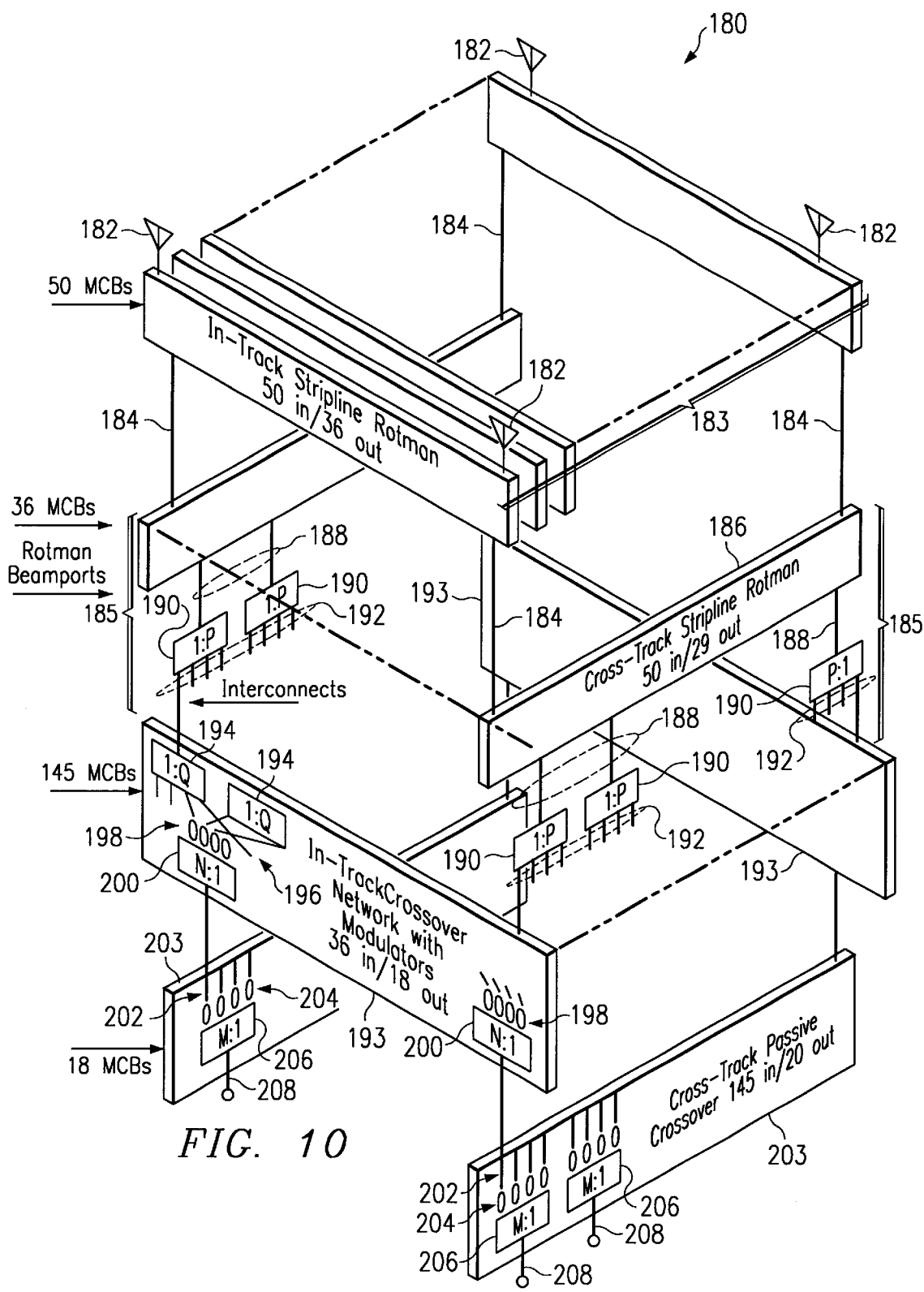
FIG. 10 is a schematic diagram illustrating details of a four-level steering system in accordance with one embodiment of the present invention.

FIG. 10 illustrates details of a four-level steering system 180 in accordance with one embodiment of the present invention. In this embodiment, four-level first component 183 and four-level second component 185 focus signals received by radiating elements 182. Four-level third component 193 and four-level fourth component 203 modulate and combine component beams focused by four-level first and second components 183 and 185 to steer beams 32 that are described in reference to FIG. 1.

For purposes of this description, discrete elements of four-level first component 183 and four-level third component 193 shall be referred to as being longitudinally disposed in an in-track direction, while discrete elements of four-level second component 185 and four-level fourth component 203 shall be considered to be longitudinally disposed in a cross-track direction. In-track and cross-track directions may be oriented substantially perpendicular to one another. Components 183, 185, 193 and 203 may be stacked proximate to each other sequentially such that discrete elements for a particular component may be coupled to discrete elements of other components using interconnects that physically couple such elements together and also include paths for signals to be communicated between elements of different components. Thus, four-level steering system may resemble four layers of stacked slats forming a lattice-like structure. Each slat, as earlier described, may be implemented using a microwave circuit board or other suitable device.

Referring to FIG. 10, four-level first component 183 includes a set of discrete elements disposed similarly to discrete elements 60 of FIG. 3. Each element of four-level first component 183 includes an array of low noise amplifiers and a planar lens. As described in reference to FIG. 3, the low noise amplifiers amplify signals received by radiating elements 182. The planar lens is a parallel plate or other suitable lens having two-dimensional characteristics such as those described in FIGS. 3 and 4 relative to first planar lens 64. Like first planar lens 64, the planar lens in each element of four-level first component 183 is configured in order to best allow four-level steering system 180 to adequately cover cells 20 within footprint 18. In general, and like first planar lens 64, the planar lens provided in each element of four-level first component 183 includes strip lines that focus signals received by radiating elements 182 in a first direction, and feed elements that collect the signals that have been focused in the first direction. Thus, each element of four level first component 183 focuses signals received from certain radiating elements 182 in a first direction, and passes the focused signals through component paths 184 so as to traverse interconnects to the elements of four-level second component 185.

Four-level second component 185 includes a set of discrete elements disposed generally perpendicular to the elements of four-level first component 183. Each of such elements may be directly interconnected to the elements of four-level first component 183 so as to form an arrangement of stacked slats as previously described in connection with FIGS. 7 through 9. Each element of four-level second component 185 includes a lens subcomponent 186 and splitters 190. Each lens subcomponent 186 includes a planar lens, with associated strip lines and feed elements, in order to further focus the signals received along component path 184 in a second direction. After the second focusing by the planar lens of lens subcomponent 186, focused signals are delivered along component paths 188 and received as focused beams by splitters 190. For example, signals focused in two directions using a Rotman lens as the planar lens in each of four-level first component 183 and four-level second component 185 may result in a pencil-beam, or other suitable beam, being delivered along component paths 188.

Splitters 190 divide the focused beams from component paths 188 into intermediate beams. Each intermediate beam is then provided along one of intermediate paths 192 over interconnects to one of the discrete elements of four-level third component 193. Splitters 190 split focused beams provided by lens subcomponent 186 into P number of intermediate beams, where P is determined by the maximum cell width of cells 20 in the cross-track direction for which a particular focused beam is to be utilized to generate a steered composite beam. For example, a particular focused beam may be utilized across a maximum width of five cells in the longitudinal direction of a particular element of four level third component 193, also referred to as in the cross-track direction. Thus, P for a particular splitter 190 included in such particular element and associated with that particular focused beam would be five.

As shown in FIG. 10, four-level third component 193 also includes a set of discrete elements that are disposed generally perpendicular to the elements of four-level second component 185, thus continuing the lattice-like slat structure of four-level steering system 180. Each element of four-level third component 193 includes splitters 194 connected via intermediate paths 196 and through attenuators 198 to combiners 200.

Similar to splitters 190, each splitter 194 receives a single intermediate beam along intermediate path 192 and divides the single intermediate beam into Q number of further intermediate beams along intermediate paths 196. Q, or the number of intermediate beams generated by a particular splitter 194, is determined by the maximum cell width of cells 20 in the in-track direction for which the intermediate beam is to be used to generate a steered composite beam. One of combiners 200 sums the intermediate beam provided by a particular splitter 194 along one of intermediate paths 196 with other intermediate beams from other splitters 194 within the same element of four-level third component 193. Such combining is accomplished by one of combiners 200 after each of the intermediate beams to be combined have been attenuated by one of attenuators 198. Attenuators 198 may modulate the amplitude, shape, or other characteristics of an intermediate beam as described in reference to attenuators 84 of FIG. 5. Thus, intermediate beams from several splitters 194 may each be separately modulated by one of attenuators 84 before being combined by one of combiners 200. As shown in FIG. 10, each of combiners 200 combine an N number of intermediate beams in the in-track direction and provide as an output a composite beam along one of first composite paths 202 to a particular element of four-level fourth component 203.

Four-level fourth component 203, like each of the other components of four-level steering system 180, includes a set of discrete elements disposed generally parallel to one another and generally perpendicular to the elements of four-level third components 193 in the lattice-like slat structure of four-level steering system 180. Each element of four-level fourth component 203 includes attenuators 204 and combiners 206. In general, combiners 206 combine composite beams from different elements of four-level third component 193 that have been modulated by attenuators 204 to form a final composite beam for a particular cell at one of final composite paths 208. Thus, a particular combiner 206 may combine, for example, composite beams from four different elements of four-level third component 193 after such composite beams have been further attenuated for amplitude, shape, or otherwise, in order to form a final composite beam composed of N times M component or intermediate beams. It should be understood that, although splitters 190 and 194, and combiners 200 and 206, are all illustrated having the common variables of P, Q, N and M, the value of a certain P may be different from other Ps, and the values of particular Qs, Ns, or Ms, may be different from other Qs, Ns, or Ms. Thus, for each final composite beam for a particular cell 20 from footprint 18, several rows of component or intermediate beams, each including a different number of component or intermediate beams, may be used to generate a particular weighted combination of beam components that is unique to a particular cell. Likewise, the combination of intermediate or component beams used to generate the final composite beam for a particular cell may each be shaped, weighted, or otherwise modulated to best produce a steered final composite beam for a particular cell. The terms "weigh", "weighing", or "weighted", may be used to generally describe any and all suitable means of modulating beams or signals in this application, including phase shift.

Figure 11:
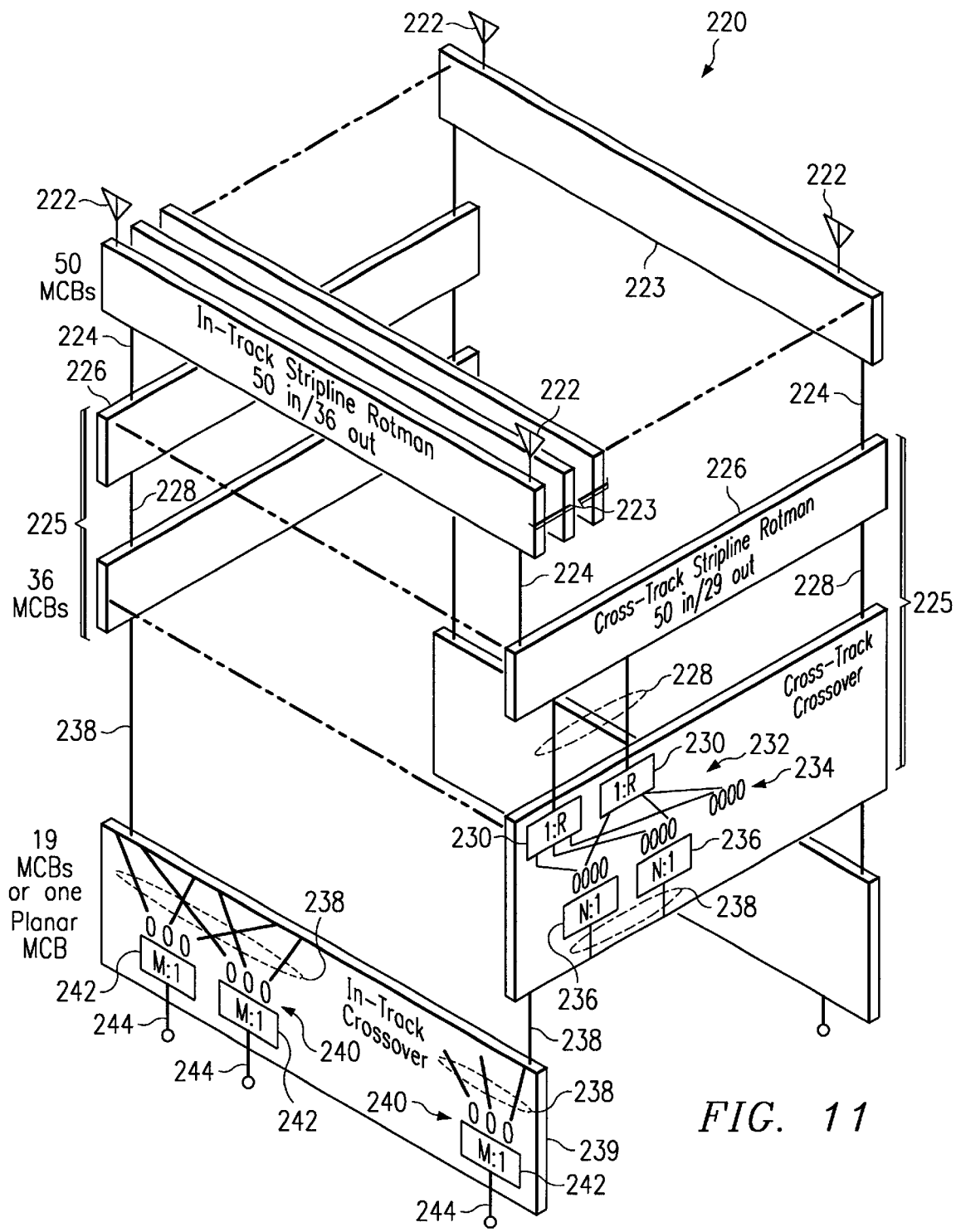
FIG. 11 is a schematic diagram illustrating details of a three-level steering system in accordance with one embodiment of the present invention.

FIG. 11 illustrates details of a three-level steering system 220 in accordance with one embodiment of the present invention. In this embodiment, three-level first component 223 and portions of three-level second component 225 focus signals received by radiating elements 222. Other portions of three-level second component 225 and three-level third component 239 modulate and combine component beams generated as a result of such focusing in order to steer beams 32 that are described in reference to FIG. 1. Such steered beams 32 are identified in the description of this FIG. 11 as final composite beams.

For purposes of this description, discrete elements of three-level first component 223 and three-level third component 239 shall be referred to as being longitudinally disposed an in-track direction, while discrete elements of three-level second component 225 shall be considered to be longitudinally disposed in a cross-track direction.

Referring to FIG. 11, three-level first component 223 includes a set of discrete elements disposed similarly to the discrete elements of four-level first component 183 of four-level steering system 180. Each element of three-level first component 223 includes an array of low noise amplifiers and a set of planar lenses. Such low noise amplifiers and such planar lenses of each element of three-level first component 223 function as described in reference to the low noise amplifiers and planar lens of four-level first component 183 of FIG. 10, and provide signals that are received from certain of radiating elements 222, and focused by the planar lens in a first direction, through component paths 224 so as to traverse interconnects to the elements of three-level second component 225.

Three-level second component 225 includes a set of discrete elements disposed generally perpendicular to the elements of three-level first component 223. Each of such elements may be directly interconnected to the elements of three-level first component 223 so as to form an arrangement of stack slats as shown in FIG. 11. Each element of three-level second component 225 includes a lens subcomponent 226, splitters 230, attenuators 234, and combiners 236. Each lens subcomponent 226 includes a planar lens, with associated strip lines and feed elements, that further focuses the signals received along component path 224 from three-level first component 223 in a second direction. Thus, focused beams, such as pencil-beams for example, can be delivered after such second focusing along component paths 228 to splitters 230.

Splitters 230 divide the focused beams provided along component paths 228 into intermediate beams. Each intermediate beam may then be provided along one of intermediate paths 232 to one of combiners 236 after being modulated by one attenuators 234. In particular, splitters 230 split the focused beams provided by lens subcomponent 226 into R number of intermediate beams, where R is determined by a total number of cells for which a particular focused beam is to be utilized to generate a steered composite beam. For example, a particular focused beam may be utilized for each of the cells within a particular portion of footprint 18, such portion including three rows of five cells 20 and two rows of four cells 20. Thus, R for such a particular portion of footprint 18 is equal to twenty-three cells for which a particular focused beam is to be utilized in order to generate a separate steered composite beam for each of the twenty-three cells 20. The number of intermediate beams generated by a particular splitter 230 may also correspond to the number of combiners 236 in which intermediate beams based on a particular focused beam are to be utilized.

Each attenuator 234 may, as described in reference to attenuators 198 and 204 of FIG. 10, modify the amplitude, shape and/or other characteristics of an intermediate beam before providing such intermediate beam to one of combiners 236. Each combiner 236 sums the modulated intermediate beam generated by a particular splitter 230 with other modulated intermediate beams generated by other splitters 230 to generate a composite beam composed of several such intermediate beams. The intermediate beams may be modulated and combined based, in part, on the relative position between three-level steering system 220 and a particular ground-based cell 20 associated with a particular combiner 236. Thus, as the cross-sectional shape of a particular ground-based cell 20 changes relative to a satellite or other object to which three-level steering system 220 is attached, attenuators 234 may weigh or otherwise modulate characteristics of the intermediate component beams in order to generate an accurately steered composite beam at one of first composite paths 238. The process behind such modulation is further described in reference to modulation by attenuators 84 of FIG. 5.

Three-level third component 239 includes a set of discrete elements disclosed generally parallel to one another and generally perpendicular to the elements of three-level second component 225, thereby continuing the lattice-like slat structure of three-level steering system 220. Each element of three-level third component 239 includes attenuators 240 and combiners 242. In general, combiners 242 combine composite beams from different elements of three-level second components 225 that have been modulated by attenuators 240 to form a final composite beam for a particular cell at one of final composite paths 244. Thus, a particular combiner 242 may combine, for example, composite beams from several combiners 236 that each reside on a separate element of three-level second component 225 after such composite beams have been further modulated for amplitude, shape, or otherwise, in order to form a final composite beam composed of N times M intermediate component beams. It should be understood that, although splitters 230 and combiners 236 and 242 are all illustrated having the common variables of R, N, and M, the value of particular Rs, Ns, or Ms, may be different from the value of other Rs, Ms, or Ns. Thus, for each final composite beam for a particular ground-based cell 20 from footprint 18, several rows of intermediate component beams, each including a different number of intermediate component beams, may be used to generate a particular weighted combination of beam components that is unique to a particular cell. Likewise, the combination of intermediate component beams used to generate the final composite beams for a particular cell may be shaped, weighted, or otherwise attenuated to best produce a steered final composite beam for a particular cell.

Figure 12:
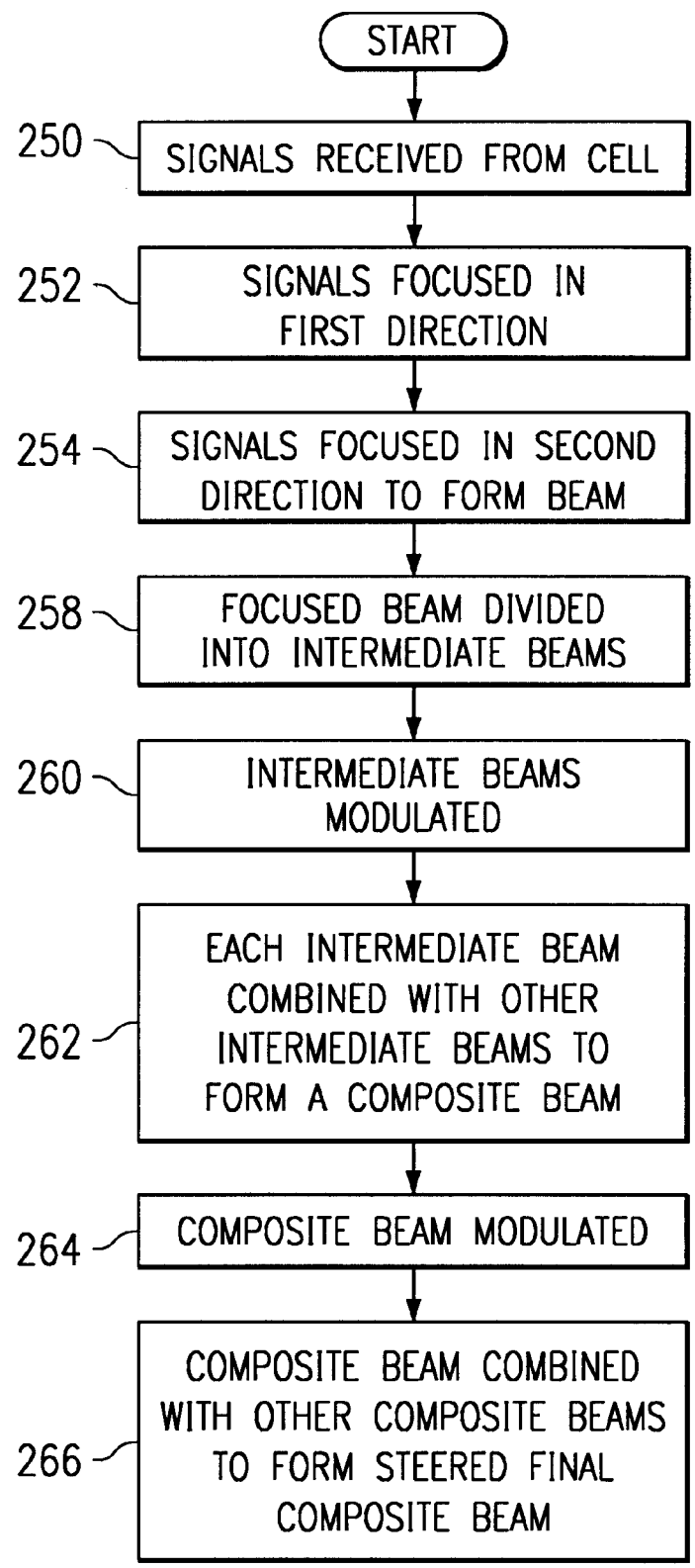
FIG. 12 is a flowchart of a method of steering an antenna in accordance with one embodiment of the present invention.

FIG. 12 illustrates a method of steering an antenna that focuses signals originating from a particular ground-based cell into a focused beam that can then be steered for better reception and processing of such signals. In Step 250, signals are received from a particular ground-based cell by a radiating element such as, for example, element 222. In Step 252, such signals are then focused in a first direction using a planar lens, such as, for example, the Rotman lens of FIG. 4. In Step 254, the focused signals are further focused in a second direction by a second planar lens such as planar lens 226. The resultant focused beam is then divided in Step 258 into several intermediate beams by a splitter such as one of splitters 230. The intermediate beams are then modulated in Step 260 by an attenuator such as one of attenuators 234. Each of the modulated intermediate beams is then combined with other modulated intermediate beams from other splitters 230 in Step 262 using, for example, a combiner such as one of combiners 236. In Step 264, a composite beam that is the output of one of combiners 236 is then further modulated in Step 264 before being combined with other modulated composite beams from other combiners 236 in Step 266 so as to compose a final steered composite beam for a particular ground-base cell 20. In such a manner, multiple focused beams can be individually modulated and then combined in particular combinations to best produce a steered composite beam for a particular cell based on an antenna steering system's relative position with reference to a particular ground-based cell 20. Such a method allows better reception and processing of signals transmitted between a point of origin and an antenna when there is relative movement between such point of origin and such antenna.

In addition to the low earth orbit satellite 12, the present invention may be used in connection with other systems that require multiple beams to be shaped. For example, the present invention can be used in combination with beam steering systems for geosynchronous communication satellites that use steerable spot beams, listening antennas such as ESM (Electronic Support Measures) antennas, and transmit antennas such as ECM (Electronic Counter Measures) antennas. This invention can also be used for antennas mounted on aircraft, dirigibles, or other platforms that orbit or are stationed above cites to provide communication services. This invention can also be used on fixed ground based towers.

Although the present invention has been described as a receive antenna, the invention may be used for a transmit antenna. In a transmit application, power amplifiers will be located at the radiating elements instead of low noise amplifiers.

Although the present invention has been described with several embodiments, various changes and modifications may be suggested to one skilled in the art. It is intended that the present invention encompass such changes and modifications as fall within the scope of the appended claims.

What is claimed is:

1. A system for steering an antenna, the system comprising:
   a first component including a first lens and operable to perform a first focusing of a plurality of signals to form a plurality of focused signals;
   a second component including a second lens and operable to form a first focused beam by performing a second focusing of the plurality of focused signals, the second component further including a first splitter and further operable to split the first focused beam into a first set of intermediate beams;
   a third component including a second splitter and operable to split a particular one of the first set of intermediate beams into a second set of intermediate beams, the third component further including a first combiner and further operable to combine a particular one of the second set of intermediate beams with at least one other intermediate beam split from a second focused beam to generate a composite beam; and
   a fourth component including a second combiner and operable to combine the composite beam with at least one other composite beam to generate a steered final composite beam for a particular ground-based cell.

2. The system of claim 1, wherein the third component includes an attenuator, the attenuator operable to modify the magnitude of the particular one of the second set of intermediate beams before combining the particular one of the second set of intermediate beams with the at least one other intermediate beam.

3. The system of claim 1, wherein the fourth component includes an attenuator, the attenuator operable to modulate the composite beam before the composite beam is combined with the at least one other composite beam.

4. The system of claim 1, wherein each component is a microwave circuit board.

5. The system of claim 1, wherein the first lens is a first planar lens operable to perform the first focusing.

6. The system of claim 5, wherein the second lens is a second planar lens, the second planar lens operable to perform the second focusing to create the at least one beam in the shape of a pencil beam.

7. The system of claim 1, wherein the first and third components are substantially parallel and wherein the second and fourth components are substantially parallel.

8. The system of claim 1, wherein the third component includes a first attenuator operable to weigh the particular one of the second set of intermediate beams before the particular one of the second set of intermediate beams is combined with the at least one other intermediate beam to generate a composite beam, and wherein the fourth component includes a second attenuator operable to weigh the composite beam before the composite beam is combined with the at least one other composite beam, the weighing by the first attenuator and the second attenuator being in response to the position of the antenna relative to the ground-based cell.

9. A system for steering an antenna, the system comprising:
   a first component including a first lens and operable to perform a first focusing of a plurality of signals received from a ground-based cell;
   a second component including a second lens, a splitter, and a first combiner and operable to perform a second focusing of the plurality of signals to form a first focused beam, the second component further operable to split the first focused beam into a plurality of intermediate beams and combine at least one of the plurality of intermediate beams with at least one other intermediate beam split from a second focused beam to generate a composite beam; and
   a third component including a second combiner and operable to combine the composite beam with at least one other composite beam thereby generating a steered final composite beam for the ground-based cell.

10. The system of claim 9, wherein the second and third components each include an attenuator operable to weigh a beam in response to the position of the antenna relative to the ground-based cell by modulating the amplitude of the beams.

11. The system of claim 9, wherein the first component includes a first plurality of planar slats, the second component includes a second plurality of planar slats, and the third component includes a third plurality of planar slats, the first and third plurality of slats substantially parallel to each other and substantially perpendicular to the second plurality of slats.

12. The system of claim 11, wherein each of the first plurality of planar slats includes a lens, each of the second plurality of slats includes a lens, a splitter, and a combiner, and each of the third plurality of slats includes a combiner.

13. The system of claim 9, wherein the first and second lenses are Rotman lenses operable to perform the focusing, each Rotman lens having non-uniform feed elements that shape each beam in accordance with an angular size of an assigned ground-based cell relative to the position of the antenna system.

14. The system of claim 9, wherein each of the first, second, and third components includes a parallel array of microwave circuit boards.

15. A method of steering an antenna, the method comprising:
   focusing a plurality of signals into a focused beam;
   splitting the focused beam into a plurality of intermediate beams;
   combining at least one of the intermediate beams with at least one other intermediate beam split from another focused beam to generate a composite beam; and
   combining the composite beam with at least one other composite beam.

16. The method of claim 15, wherein focusing the plurality of signals further comprises:
   focusing at least one of the plurality of signals using a first lens; and
   further focusing the at least one of the plurality of signals using a second lens.

17. The method of claim 15, wherein further focusing the plurality of signals further comprises:
   focusing at least one of the plurality of signals using a first lens; and
   further focusing the at least one of the plurality of signals using a second lens, the second lens oriented perpendicular to the first lens.

18. The method of claim 15, wherein combining at least one of the intermediate beams includes modulating the amplitude of the at least one intermediate beam.

19. The method of claim 15, wherein combining at least one of the intermediate beams includes modulating the amplitude of the at least one intermediate beam in response to the relative position of the antenna with respect to a ground-based cell.

20. The method of claim 15, wherein focusing a plurality of signals further comprises focusing a plurality of signals using two lenses, the first lens disposed in a first discrete element, the second lens disposed in a second discrete element, wherein the step of splitting the focused abeam further comprises splitting the focused beam using a splitter disposed in the second discrete element, wherein the step of combining at least one of the intermediate beams further comprises combining the at least one of the intermediate beams using a combiner disposed in the second discrete element, and wherein the step of combining the focused beam further comprises combining the focused beam using a combiner disposed in a third element disposed, the third element longitudinally oriented substantially parallel to the first element and substantially perpendicular to the second element.

* * * * *

UNITED STATES PATENT AND TRADEMARK OFFICE
CERTIFICATE OF CORRECTION

PATENT NO.    : 6,275,184 B1
DATED         : August 14, 2001
INVENTOR(S)   : Christian O. Hemmi et al.

Page 1 of 1

It is certified that error appears in the above-identified patent and that said Letters Patent is hereby corrected as shown below:

<u>Column 17,</u>
Line 13, after "focused", delete "abeam", and insert -- beam --.

Signed and Sealed this

Fifth Day of March, 2002

*Attest:*

*Attesting Officer*

JAMES E. ROGAN
*Director of the United States Patent and Trademark Office*